(12) United States Patent
Snyder et al.

(10) Patent No.: US 6,636,664 B2
(45) Date of Patent: Oct. 21, 2003

(54) SINGLE CHANNEL M X N OPTICAL FIBER SWITCH

(75) Inventors: James J. Snyder, Soquel, CA (US); Stephen L. Kwiatkowski, Sunnyvale, CA (US)

(73) Assignee: Soquel Technology, Inc., Santa Cruz, CA (US)

( * ) Notice: Subject to any disclaimer, the term of this patent is extended or adjusted under 35 U.S.C. 154(b) by 152 days.

(21) Appl. No.: 09/775,769

(22) Filed: Feb. 1, 2001

(65) Prior Publication Data

US 2001/0046345 A1 Nov. 29, 2001

Related U.S. Application Data

(60) Provisional application No. 60/179,473, filed on Feb. 1, 2000.

(51) Int. Cl.$^7$ ............................................. G02B 6/26
(52) U.S. Cl. ........................ 385/36; 385/16; 385/25; 385/33; 385/17; 385/115; 385/119
(58) Field of Search ............................... 385/14, 15, 16, 385/17, 36, 31, 32, 33; 359/639, 640, 822

(56) References Cited

U.S. PATENT DOCUMENTS

| | | | | | |
|---|---|---|---|---|---|
| 4,131,021 A | * | 12/1978 | Mezrich et al. | ............... | 73/606 |
| 4,420,836 A | * | 12/1983 | Harper | ..................... | 359/858 |
| 4,484,793 A | * | 11/1984 | Laude | ........................ | 385/25 |
| 4,636,030 A | * | 1/1987 | Carter et al. | ................. | 385/36 |
| 5,074,642 A | * | 12/1991 | Hicks | ....................... | 385/116 |
| 5,391,165 A | * | 2/1995 | Fountain et al. | ............. | 359/211 |
| 5,465,243 A | * | 11/1995 | Boardman et al. | ...... | 369/112.28 |
| 5,469,277 A | * | 11/1995 | Kavehrad et al. | ............. | 385/17 |
| 5,524,153 A | * | 6/1996 | Laor | .......................... | 385/126 |
| 5,566,260 A | * | 10/1996 | Laughlin | ..................... | 385/16 |
| 5,621,829 A | * | 4/1997 | Ford | .......................... | 385/115 |
| 5,793,528 A | * | 8/1998 | Wallace et al. | ............. | 248/481 |
| 5,864,436 A | * | 1/1999 | Noyes | ....................... | 359/350 |
| 6,002,818 A | * | 12/1999 | Fatehi et al. | .................. | 385/16 |
| 6,134,358 A | * | 10/2000 | Wu et al. | ..................... | 385/11 |
| 6,253,010 B1 | * | 6/2001 | Belser et al. | ................. | 385/16 |
| 6,295,170 B1 | * | 9/2001 | Wallace et al. | ............. | 359/813 |
| 6,344,937 B1 | * | 2/2002 | Sparrold et al. | ............ | 359/837 |

* cited by examiner

Primary Examiner—Michael P. Stafira
Assistant Examiner—Juan D Valentin, II
(74) Attorney, Agent, or Firm—Burns, Doane, Swecker & Mathis LLP

(57) ABSTRACT

A single channel M×N optic switch is provided in accordance with the present invention to steer light radiating from any one fiber in an input bundle into any selected fiber in an output bundle. Precision beam-steering optics is implemented using a Risley prism pair controlled by a small computer. In order to efficiently couple light between two single-mode optical fibers a low-aberration lens approximately collimates the light from the source fiber before it is passed through the Risley prisms in order to minimize the aberrations introduced by the prisms as they collectively deflect the beam through some precise angle. A second low-aberration objective lens is used to refocus the light at the core of a selected output fiber. The focusing lens transforms the angular deflection of the beam into a change in the position of the focused spot in the focal plane of the lens. In order to switch the light beam from one fiber in the output bundle to another, the Risley prisms are individually rotated about the optical axis to predetemined orientations so as to deflect the collimated light at the exact angle necessary to direct the focused spot to the core of a selected output fiber.

40 Claims, 5 Drawing Sheets

SINGLE CHANNEL M X N OPTICAL FIBER SWITCH

CROSS REFERENCE TO RELATED APPLICATIONS

Reference is made to and priority claimed from U.S. provisional application Ser. No. 60/179,473, filed Feb. 1, 2000, entitled "Single Channel M×N Optical Fiber Switch".

FIELD OF THE INVENTION

The present invention relates generally to fiber optics communication apparatus, and more specifically to an improved fiber-optic switch using a Risley prism pair to steer a light beam emitted from any one of M input optical fibers to any one of N output optical fibers.

The switch provides low insertion loss over a wide spectral bandwidth, a high degree of robustness and stability, and moderate microprocessor-controlled switching speeds (tens of msec) for values of M and N as high as a few hundred. It also provides the ability to self-align individual fiber channels as necessary to compensate for mechanical or thermal drift. Applications include multi-channel sampling switches for polling-type monitoring instruments, network rerouting and bypassing switches, and wavelength-selective add/drop switches.

BACKGROUND

Typically, fiber-optic switches are implemented on a small scale (i.e., only one or two input and output fibers per switch) either opto-mechanically (by such means as physically moving bare fiber tips into alignment with each other for proximity coupling, butt coupling), or electro- or thermo-optically, (using interference in optical waveguides to switch between channels). The small-scale switches may then be combined in a switching "tree" to achieve larger values of M and N (in an M×N array). Because of the extremely tight tolerances necessary for efficient fiber coupling, existing opto-mechanical switches tend to be expensive, unreliable, and not very robust. Optical waveguide switches are more robust, but have high insertion loss and poor stability. Moreover, the assembly of small-scale switches into a tree exacerbates the insertion losses, which are multiplicative in the number of elements.

Although there are several optical methods available for steering a beam of light, Risley prisms offer significant advantages in terms of sensitivity and stability. Risley prisms change the deflection angle of a light ray by rotation of the prisms about an optical axis. The prisms typically require a large rotation angle to change the deflection angle by a small amount; that is, the rotational motion of the Risley prisms is demagnified in its effect on the deflection angle. The demagnification is not constant, but varies with the magnitude of the deflection angle. For example, as shown below, a Risley pair with 1° maximum deflection has a demagnification of fifty-seven or greater (magnification of 0.0175 or less); that is, a change in deflection angle of one arcsecond requires rotating the Risley prism about the optical axis through almost one arcminute or more. Because of the demagnification, and because of the insensitivity of the deflection angle to changes in the other degrees of freedom (tilt or displacement) of the prisms, Risley prisms provide extremely stable beam pointing.

Conventional optical methods for beam steering are much more sensitive to the mechanical stablity of the steering element because they do not provide the inherent demagnification of the Risley prisms. For example, in the usual method of beam steering with a tiltable mirror, the deflection angle of a light ray reflected from a mirror changes by twice the change in tilt angle of the mirror; that is, the mirror has a magnification of two (demagnification of one half). To achieve comparable stability in the direction of the steered beam, the thermal and mechanical stability of the mirror and its mounting structure must be more than one hundred times better than the stability of the Risley prism switch.

Another commonly used beam steering approach is to decenter a lens in the beam path. In this case, the magnification is one, so the stability requirements are similar to those of the tiltable mirror. This stability is often hard to achieve in an adjustable mount.

SUMMARY OF THE INVENTION

It is therefore an object of the present invention to utilize the positive characteristics of the Risley prism to provide an improved optical switching mechanism that is relatively inexpensive, is robust and exhibits good stability, and has relatively low insertion loss.

Briefly, a single channel M×N optical switch in accordance with the present invention is provided which utilizes Risley prism techniques as means to steer light radiating from any one fiber in an input bundle into any selected fiber in an output bundle. More specifically, precision beam-steering optics is implemented using a Risley prism pair controlled by a small computer. In order to efficiently couple light between the two single-mode optical fibers a low-aberration lens approximately collimates the light from the source fiber before it is passed through the Risley prisms. The light beam passing through the prisms is approximately collimated in order to minimize the aberrations introduced by the prisms as they collectively deflect the beam through some precise angle. A second low-aberration objective lens is used to refocus the light at the core of a selected output fiber. The focusing lens transforms the angular deflection of the beam into a change in the position of the focused spot in the focal plane of the lens. In order to switch the light beam from one fiber in the output bundle to another, the Risley prisms are individually rotated about the optical axis to predetemined orientations so as to deflect the light from the input fiber at the exact angle necessary to direct the focused spot to the core of a selected output fiber.

IN THE DRAWINGS

DESCRIPTION OF PREFERRED EMBODIMENTS

A Risley prism pair is an optical device that deflects a transmitted light ray through a small, controllable angle. The device typically consists of a pair of identical, small-angle prisms through which the light travels at near-normal incidence to the prism surfaces. Each prism causes a deviation of the direction of travel of the light ray according to its wedge angle and refractive index. If a single prism is rotated about the normal to its surface (i.e., rotated about the optical axis), the refracted ray traces out the surface of a cone centered on the direction of the incident ray. If the incident ray traverses two such prisms, and each of the prisms is rotated independently, then the transmitted ray may be steered at any deflection angle with a magnitude up to twice the single prism deflection. However, due to manufacturing tolerances, a deflection angle of zero may not be achievable since that requires the prisms to be identical.

Figure 1:
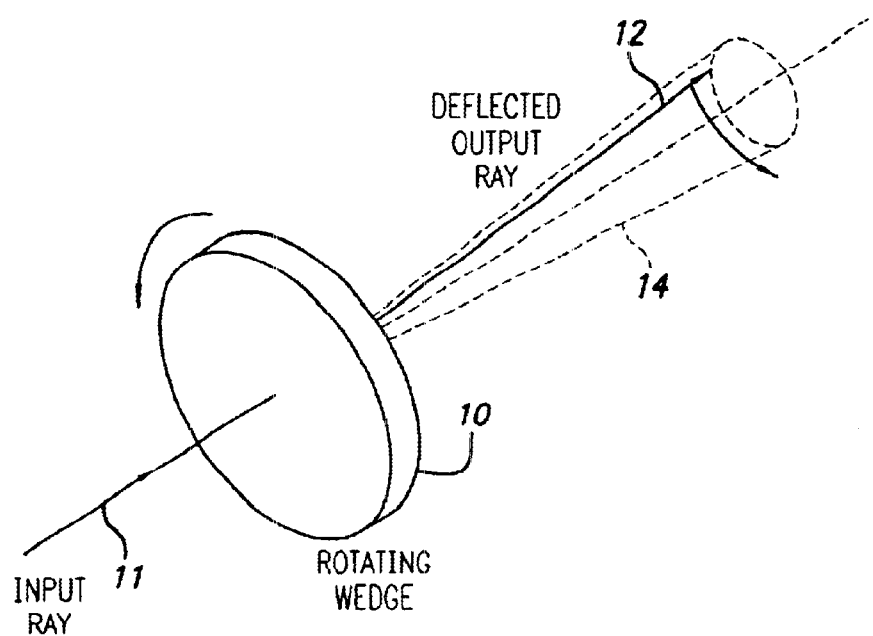
FIG. 1 is a simplified diagram showing a single wedge prism deflecting a light ray through a fixed angle.

As shown in FIG. 1 of the drawing, a single prism 10 with wedge angle $\alpha_w$ and index of refraction n deflects a ray 12 through the angle $$\alpha = (n-1)\alpha_w \quad (1)$$

Each prism, when rotated separately, moves the deflected ray 12 around the surface of a cone 14.

Figure 2:
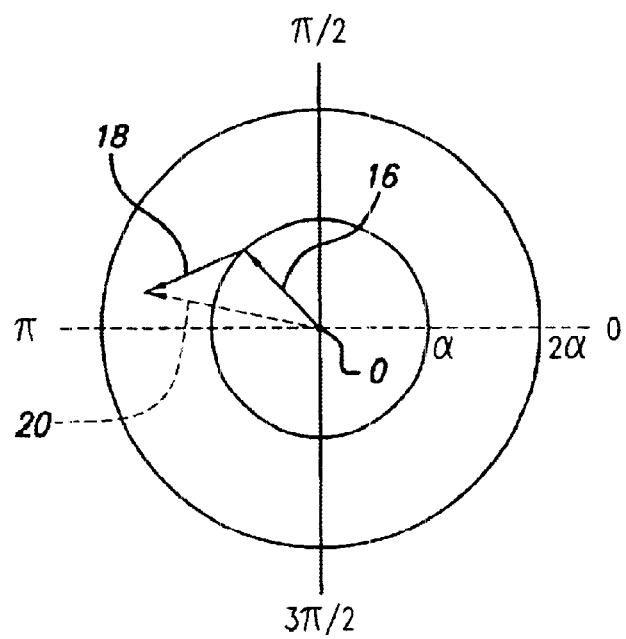
FIG. 2 is a polar coordinate diagram showing the deflection vectors for a fiber optic switch in accordance with the present invention.

FIG. 2 is a polar coordinate system showing the deflection vectors 16 and 18 for each prism in a Risley pair. The vector 16 describes the deflection of a single prism and has a fixed length of $\alpha$, and an arbitrary polar angle. The second vector 18 describes the deflection of a second prism. The sum of the vectors 16 and 18 for the two prisms is the net deflection vector 20 of the Risley pair. If the two prisms are rotated independently, the Risley vector 20 can take on any magnitude between 0 and $2\alpha$, and any polar angle between 0 and $2\pi$. The origin 0 represents the direction of the incident laser beam 11 shown in FIG. 1. The deflection for each prism (solid vectors 16 and 18) has constant magnitude $\alpha$ and arbitrary polar angle. Since the Risley vector 20 can have arbitrary magnitude up to a maximum of $2\alpha$ and arbitrary polar angle, it can address any point in an image plane within an angle of $2\alpha$ from the incident laser beam direction.

Although the Risley prism pair can deflect a beam anywhere within a cone with a half-angle of $2\alpha$, identifying the prism angles corresponding to a particular deflection is non-intuitive. However, if the rotation of the prisms is constrained to either co-rotation (rotation in the same direction by equal amounts) or counter-rotation (rotation in opposite directions by equal amounts), the deflection corresponds naturally to a polar coordinate system for the Risley vector, with the incident ray direction defining the origin. Counter-rotation of the prisms changes the magnitude, and co-rotation changes the polar angle of the Risley vector describing the net deflection of the ray.

Steering the deflected beam by Risley prism rotation is generally complicated, but if the prisms are constrained to pure co-rotation and counter-rotation, the steering is locally orthogonal. That is, for small changes in the Risley vector, co-rotation and counter-rotation of the prisms provides orthogonal motion of the deflected beam. This characteristic greatly simplifies automated search routines that optimize alignment of the beam to a target such as the core of an optical fiber.

Figure 3A:
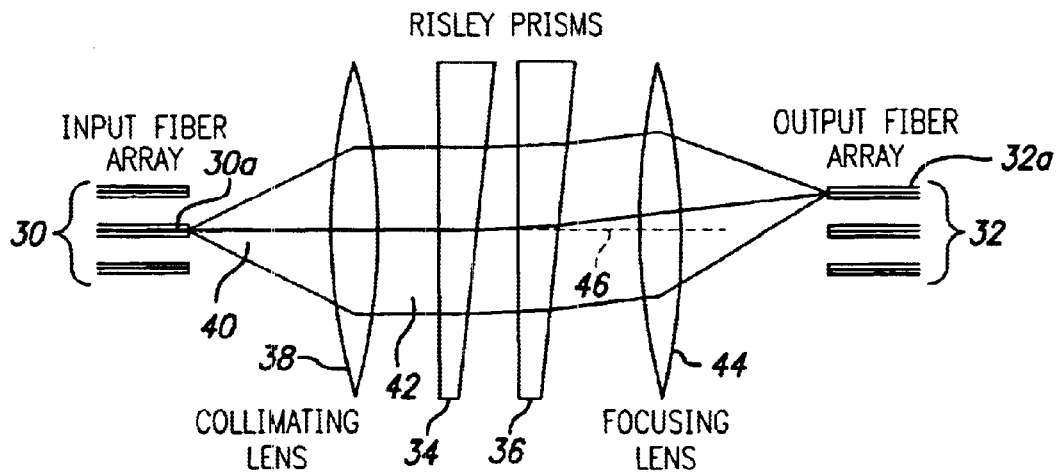
FIGS. 3A–3C are simplified drawings illustrating operation of the present invention.
Figure 3B:
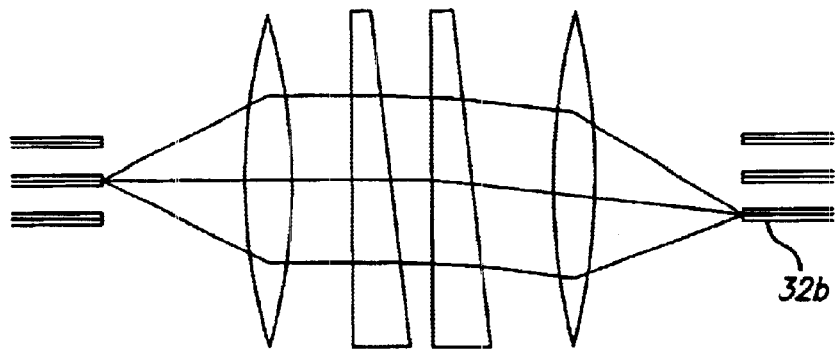
Figure 3C:
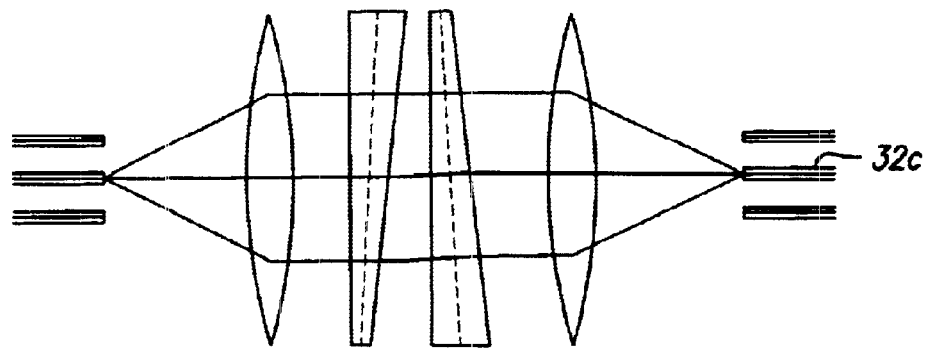

Referring now to FIGS. 3A, 3B and 3C communicative coupling between an input optical fiber of an input fiber array 30 and an output fiber array 32 of a basic M×N fiber switch in accordance with the present invention is illustrated. These FIGS. illustrate in simplified form how, by rotating the prisms 34 and 36, light from one of the input fibers 30a can be selectively coupled to output fiber 32a, 32b and 32c.

In order to efficiently couple light between two single-mode optical fibers using Risley prisms 34 and 36 for steering, a low-aberration lens 38 approximately collimates the light 40 from the source fiber 30a before it is passed through the prisms. The light beam 42 passing through the prisms is approximately collimated in order to minimize the aberrations introduced by the prisms. The prisms collectively deflect the beam 42 through some precise angle, and a second low-aberration objective lens 44 refocuses the light at the core of a selected output fiber 32a. The focusing lens 44 transforms the angular deflection of the beam into a change in the position of the focused spot in the focal plane of the lens.

In order to steer the light from any input fiber 30 to any output fiber 32, the Risley prisms are individually rotated about the optical axis 46 to predetemined orientations. The prisms then deflect the light from the desired input fiber at the exact angle necessary to direct the focused spot to the core of the desired output fiber.

Unlike beam steering with tiltable mirrors, beam steering with Risley prisms is a very nonlinear function of the prism rotation. For example, consider co-rotation of the prisms to rotate the Risley vector without changing its magnitude. If the magnitude of the Risley vector is p, and the prisms co-rotate through 360°, then the Risley vector 20 traces a circle in the polar coordinate system of FIG. 2 of radius p. The circumference of the circle is $2\pi p$. The magnification is therefore equal to the magnitude of the Risley vector, and varies from zero at the origin to $2\alpha$ a at maximum deflection. For $2\alpha=1°=17.5$ mrad, the magnification at maximum deflection of the Risley vector is 0.0175.

Counter-rotating the Risley prisms changes the size of the Risley vector without affecting its orientation. If the prism rotation angle is $\theta$, so that the first prism rotates through an angle $\theta$ and the second prism rotates through $-\theta$, then the magnitude of the Risley vector is $$p = 2\alpha \sin(\theta + \phi_0), \quad (2)$$

where $\phi_0$ is defined by the initial orientation of the two prisms. Without loss of generality, we take $\phi_0=0$, so that the Risley vector is at the origin for $\theta=0$. The magnification of the Risley vector is given by its derivative with respect to $\theta$, which varies from zero to a maximum deflection to $2\alpha$ at the origin. Therefore, the maximum magnification of the Risley vector relative to counter-rotation of the prisms is the same as its maximum magnification relative to co-rotation.

Figure 4:
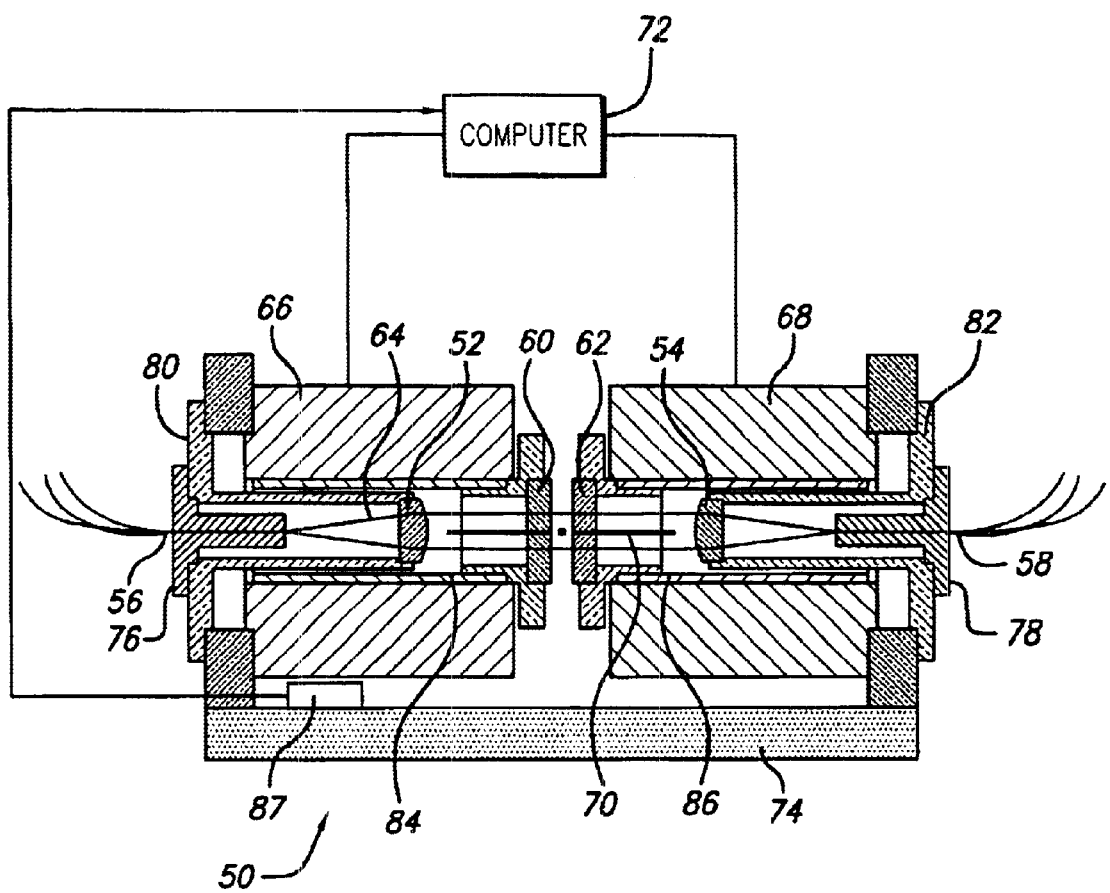
FIG. 4 is an axial cross-sectional view illustrating a preferred embodiment of the present invention.

A fiber-optic switch in accordance with the invention is shown in FIG. 4 at 50 and contains two low-aberration lenses 52 and 54 for coupling light from one fiber (56) to another (58), two identical wedge prisms 60 and 62 for steering light 64 between the desired pairs of fibers, motors 66 and 68 for rotating the prisms about the optical axis 70, and a computer 72 for controlling the prism motors. To minimize losses, the numerical aperture of the lenses is chosen to be greater than the numerical aperture of the fibers (i.e., the lenses are underfilled) in order to allow for steering the beam on the lens without vignetting the edges of the beam. The switch assembly further includes a base and motor mount 74, ferrules 76 and 78 respectively carrying the fiber bundles 56 and 58, a pair of lens mounts 80 and 82, and a pair of hollow, rotating shafts 84 and 86 respectively carrying the prisms 60 and 62 making up the Risley pair. A temperature sensor 87 may also permit the computer 72 to make appropriate control adjustments for changes in temperature.

Figure 5:
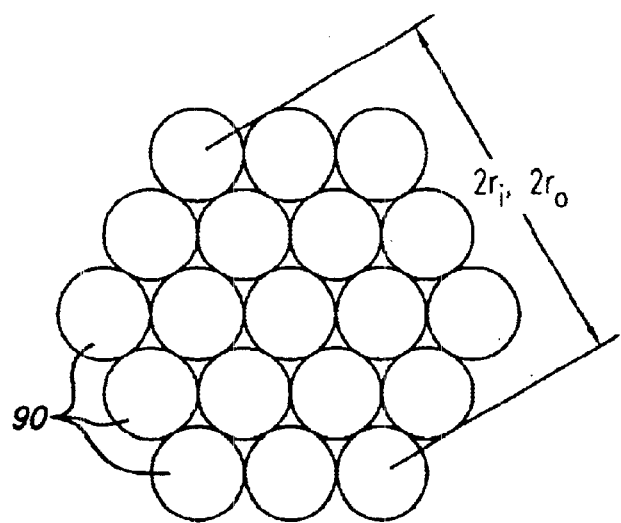
FIG. 5 is an end view of a bundle of single-mode optical fibers packed in a regular hexagonal array.

The optical fibers at the input and output of the switch are closely packed in compact bundles; for example, in a hexagonal array like the nineteen fiber tips 90 shown in FIG. 5, and have their input/output faces lying in a plane transverse to the optical axis.

The distance between the cores of the two most widely separated fibers in the input and output bundles are $2r_i$ and $2r_O$, and the focal length of the identical collimating and focusing lenses in FIGS. 3A–3C is f. The maximum magnitude of the Risley vector required to steer a beam from the edge of one bundle to the opposite edge of the other bundle is $$2\alpha \geq \frac{r_i + r_0}{f}. \tag{3}$$

In order to optimize coupling between the fiber pair, the focused spot must fall at the core of the intended output fiber with an accuracy of $\epsilon$. The required accuracy in rotating the Risley prisms to achieve this spot-positoning accuracy depends on the maximum magnitude of the Risley vector. In the worst case, at the origin or at the maximum Risley vector magnitude, as shown in FIG. 2, the rotation increment Δ for the Risley prisms must not exceed $$\Delta = \frac{\varepsilon}{2\alpha f}. \tag{4}$$

Therefore, the maximum number n of rotation increments (steps) per revolution of the Risley prisms is $$n = \frac{2\pi}{\Delta} = \frac{4\pi\alpha f}{\varepsilon}. \tag{5}$$

In an M×N Risley switch according to the present invention, where both M and N are greater than one, certain pairs of channels may experience address crosstalk. Address crosstalk is the unintended partial opening of a channel when a different channel is switched open. This can happen if the prism orientation that opens the desired channel nearly coincides with the orientation that opens a different channel. If the two orientations are sufficiently close, when either channel is opened, the other channel will be partially opened. If the input and output fiber bundles are randomly oriented, the probability of significant address crosstalk occurring is proportional to the number of input fibers, M, times the ratio of the laser spot area to the bundle cross sectional area. For single-mode fibers, the probability of any crosstalk generally will be very small since the fiber diameter is large compared with the laser spot diameter. In any event, if redundant channels are available in the switch, they can be used to replace channels having crosstalk.

In one embodiment of the present invention a 1×19 switch connects a single input fiber to any one of nineteen output fibers. The output fiber bundle is closely packed, but not perfectly hexagonal. The individual fiber diameter in the bundle is 125 μm, the overall diameter of the bundle is approximately 700 μm, and the distance $r_O$, from the core of the middle fiber to the core of a fiber at the edge of the bundle is about 300 μm. The NA of the fibers is 0.12, and the core diameter is 4 μm.

The collimating and focusing lenses are precision achromats with a focal length of 25.4 mm and a diameter of 12.7 mm. These lenses have a numerical aperture of 0.25, and provide near diffraction-limited performance over a field of view of 0.5 mm diameter.

Figure 6:
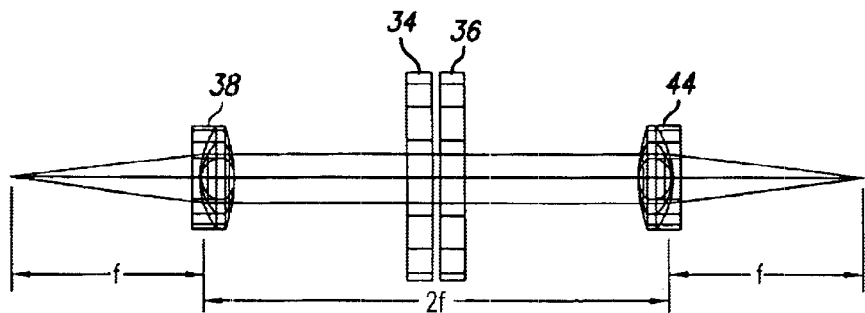
FIG. 6 is a diagram showing dimensional details of the embodiment of FIG. 4.

A "wire-frame" view of the optical layout is shown in FIG. 6. In this figure, the collimating achromat lens 38 is located one focal length, f, from the input fiber, and the focusing achromat lens 44 is a model PAC022, available from Newport Corp., Irvine, Calif. Lens 44 is located one focal length, f, from the output fiber bundle. The separation of the lenses is two focal lengths (2f), and the Risley prisms 34, 36 are positioned midway between. This optical configuration, which is similar to a telecentric configuration, improves coupling efficiency by reducing the tilt of the focused light at the tips of the output fibers.

From Eq. (3), it can be seen that the maximum deviation required is 0.68° (0.01 rad). To provide operating margin and to take advantage of commercially available wedge prisms, fused silica prisms with a wedge angle of 1.1° are used. In the visible spectrum, the index of refraction of fused silica is n=1.46, so from Eq. (1), 2α=1°=17.5 mrad. The prisms are 19 mm in diameter and 4.5 mm thick.

The incremental resolution for positioning the focused spot was chosen to be 1 μm. For this resolution, Eq. (4) implies that the rotational accuracy requirement for the Risley prisms is Δ=2.3 mrad. Accordingly, from Eq. (5), the motors 66, 68 that rotate the Risley prisms 60, 62 must provide at least 1400 steps per revolution.

The incremental resolution for the Risley Switch affects the desired coupling efficiency, $$\eta = \exp\left[-\left(\frac{s}{w_G}\right)^2\right], \tag{6}$$

where the offset, s, between the focused spot and the fiber core is at most seven-tenths of the resolution increment, and $w_G$ is approximately equal to the fiber core radius. For single-mode fiber used in the visible spectrum, the core diameter is approximately 4 μm, so an offset of 0.7 μm implies a coupling efficiency of 88%, or a 0.5 dB loss. For longer wavelengths, such as are used in telecomm applications, the core diameters of single-mode fibers range from 6–10 μm, and multi-mode fibers typically have core diameters ranging from 50 μm to millimeters. Losses for these larger cores would be insignificant for a 1 μm resolution increment.

Figure 7:
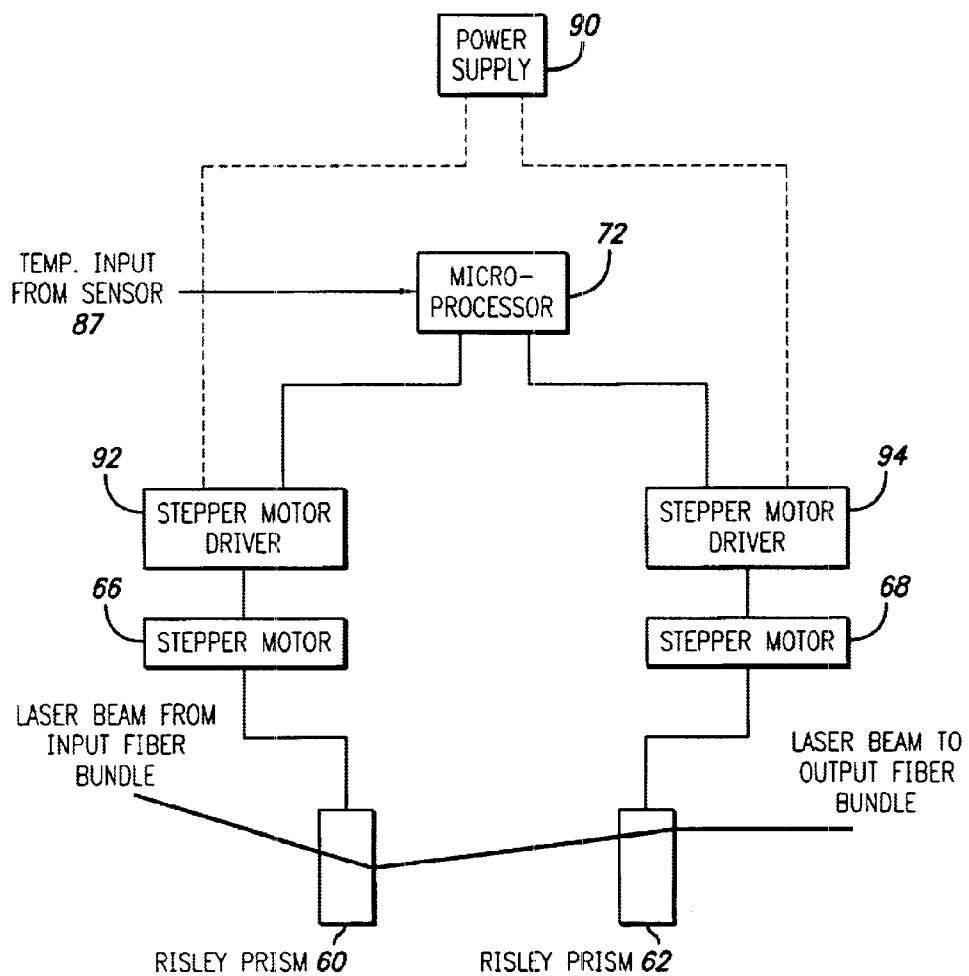
FIG. 7 is a block diagram illustrating the control system of the present invention.

A simplified block diagram of the prism drive circuit is depicted in FIG. 7 and includes a power supply 90, a microprocessor (computer) 72, and stepper motor drivers 92, 94. The Risley prisms are rotated by the pair of hollow-shaft stepper motor 66, 68 Model LA23ECK-250M, available from Eastern Air Devices, Dover, N.H., with programmable microstep drivers 92, 94 Model 3972, available from Allegro Microsystems, Worcester, Mass., that provide 1600 steps per revolution of the motor (200 full steps, and 8 microsteps per full step). As shown in the cross-section of FIG. 4, the Risley prisms 60, 62 are attached to adjacent ends of the hollow shafts 84, 86 of the two motors 66, 68 and rotate with them. The lenses 52, 54 are held inside the hollow shafts of the motors without touching them, and do not rotate.

The two motors are rigidly mounted to a baseplate 74 that maintains the relative alignment of their associated optics. Once the Risley prism rotation angles are determined and set to the appropriate values, the coupling stability between the input and output fibers depends only on the stability of the baseplate.

The Risley motors are controlled by the computer or microprocessor 72 (Basic Stamp 2SX, available from Parallax, Rocklin, Calif.) that performs the following functions:

TABLE 1

Basic Risley Switch functions.

| | |
|---|---|
| Home | Rotate the hollow shaft of each motor to its "home" position on power up or reset. Home position is determined by an optical sensor interrupted by a flag attached to the rotating shaft (not shown). |
| Switch | Rotate each prism to predefined angles in order to steer the laser beam to a desired fiber. This opens a particular optical channel between the input fiber and a particular output fiber. Hold the angular positions until commanded to switch to a new channel. |
| Search | Scan the focused spot in a spiral pattern while monitoring the power coupled into a particular fiber. Store the angular positions of the two prisms at the point of maximum coupling. These values are used to switch the laser beam to this particular fiber. |
| Tweak | Perform a closed-loop search over a small angular area to improve the coupling into a monitored fiber using co-rotation and counter-rotation of the Risley prisms. This procedure can be used in the field to re-optimize coupling efficiencies that have degraded due to thermal effects or mechanical drift. |

A single-channel M×N fiber optic Risley switch in accordance with the present invention provides an optical data connection between any one of M input optical fibers and any one of N output optical fibers. An example of a 4×3 switch is shown in Table 1.

TABLE 2

| M/N | 0 | 1 | 2 |
|---|---|---|---|
| 0 | 00 | 01 | 02 |
| 1 | 10 | 11 | 12 |
| 2 | 20 | 21 | 22 |
| 3 | 30 | 31 | 31 |

In this example, there are M=4 input fibers labeled 0–3 in the first column, and N=3 output fibers labeled 0–2 in the first rows, giving a total of 12 channels. The channels are labeled by their input and output fiber numbers. Only one of the 12 channels may be turned on at any time.

Although a general M×N fiber optic switch based on Risley prisms for laser bean steering has been described above, the approach is actually very general and can be used for many applications and in other configurations.

The switch described above is intended for use with single-mode optical fibers, but the basic concept also works with multi-mode fibers. The major differences are that the fiber core and the focused spot are much larger, so that the required spot positioning accuracy is greatly reduced and the likelihood of address crosstalk is high. The reduced spot positioning accuracy requirement simplifies the optical design and allows the use of large fiber bundles. Because of address crosstalk, multi-mode fibers might be limited to 1×N or N×1 configurations.

The most apparent application for the present invention is in coupling one optical fiber to another optical fiber. However, many other potential applications require precise, stable steering of an optical beam to a target. Examples of other possible inputs to the switch include: a laser, an array of lasers, and integrated optical devices or arrays. Examples of other possible outputs from the switch include: fiber gratings, fiber amplifiers, nonlinear crystals, and integrated optical devices or arrays.

The 1×19 switch described above uses industry standard 125 μm diameter single mode optical fibers. However, smaller diameter fibers which would allow for significantly more fibers in the same size bundle, and a much higher number of channels could be used.

Since the deflection angle of a prism depends on the index of refraction, which in turn is a function of the wavelength of the transmitted light, Risley prisms exhibit dispersion. That is, the angular deviation of a Risley prism depends on the wavelength. Since the prism wedge angles are typically small for most Risleys, the dispersion error is small. However, for broadband applications, the dispersion can cause unacceptable losses in coupling.

Fortunately, achromatic prisms can be designated and manufactured that correct the problem. As suggested by the dashed lines 35 and 37 in FIG. 3C, an achromatic prism is typically made from two different glass prisms glued together, much as is done for an achromatic lens. By proper choice of the two glasses, the achromatic prism deflects transmitted light, but the dispersion is negligible. Two of these achromatized prisms create an achromatic Risley prism for broadband applications.

Figure 8:
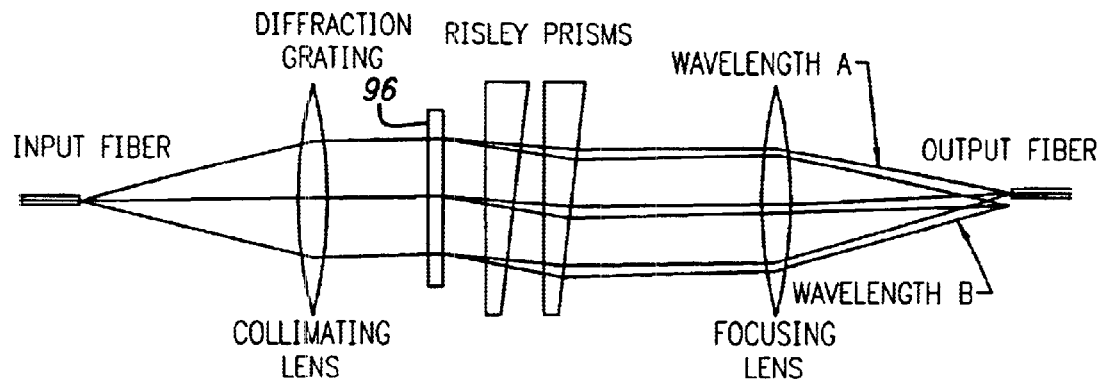
FIG. 8 is a simplified diagram showing an alternative embodiment of the present invention.

As depicted in FIG. 8, the present invention can also be configured as a wavelength selective switch by including a spectrally dispersive element, such as the diffraction grating 96 (or other dispersive element, such as another prism), in the beam path adjacent to the Risley prisms. By properly orientating the Risley prisms, any particular wavelength can be switched to an output location. The dispersive element may be positioned on either side of the prisms and will deflect the input light by differing amounts depending on the wavelength, as suggested by the rays labeled wavelength A and wavelength B. The deflection for any particular wavelength can be exactly compensated by the Risley prisms, so that the desired wavelength is coupled into the output fiber (or a particular output fiber in the case of an output array) and all other wavelengths are blocked, i.e., directed away from the output fiber as indicated by wavelength B.

The switch of the present invention offers significant advantages to applications such as coupling a laser beam to an array of disposable fiber probes or other light receivers. If the disposable fibers are packed in a ferrule in an arrayed configuration similar to that shown in FIG. 5, the ferrule can be inserted into a mating flange on the switch with sufficient accuracy that the fiber cores are always within 10–20 μm of the nominal position. If each probe fiber is monitored for light output, then the computer controlling the switch can automatically align the beam to each fiber in sequence for maximum coupling. The stability of the switch is such that the alignment should only be required once; when the probe assembly is first installed. However, if the mechanical stability of the ferrule causes coupling efficiency drift with time over ambient temperature, individual probes could be separately re-calibrated when used. Also, one or more temperature sensors 87 could be used to continuously monitor the temperature of the unit and input any change to the computer 72 which would in turn cause appropriate adjustments to be made to the control inputs to the motors driving prisms 60 and 62. It is also anticipated that some appropriate type of light sensing means might even be associated with the output fibers, or other light receivers, to monitor the intensity of the light coupled thereinto to provide an element of beam alignment feedback to the microprocessor so that stepping motor drive adjustments could be made dynamically.

An advantage of the present invention is that all the adjustments are in the switch, while the disposable probes only require reproducibility within standard manufacturing tolerances. This approach thereby minimizes the cost of the disposable component.

Figure 9:
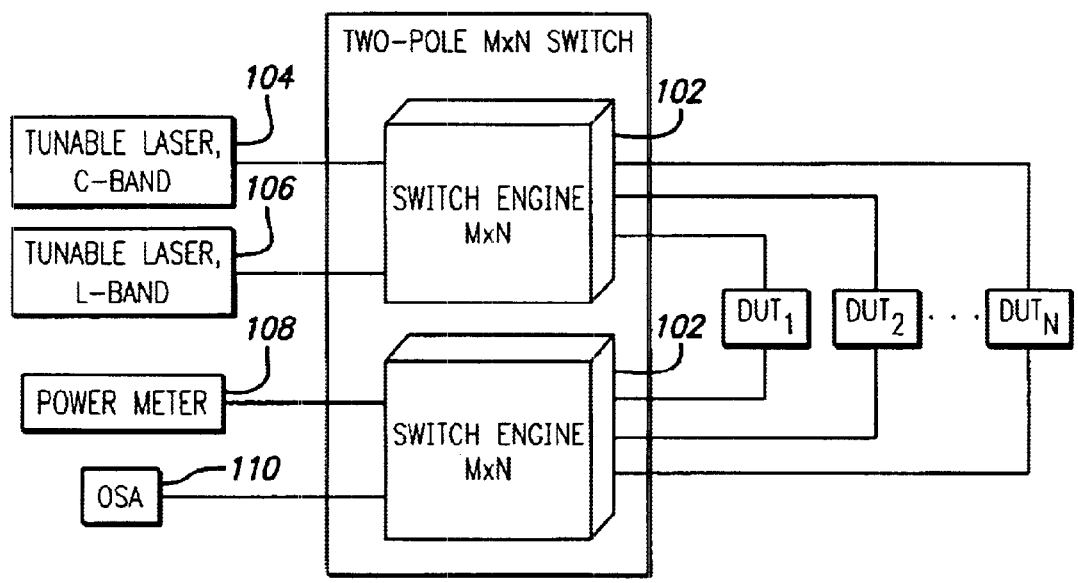
FIG. 9 is a block diagram illustrating utility of the present invention.

FIG. 9 is a block diagram illustrating application of a pair of switches in accordance with the invention to perform dual-port component testing. In this embodiment two M×N switches 100 and 102 are used to selectively exercise N devices under test (DUT). In this configuration, switch 100 permits selective application of test signals from one of a plurality of signal sources 104,106 to a selected DUT. Similarly, switch 102 allows one of a plurality of signal measuring devices 108,110 to monitor the result of the signal application to the DUTs.

An opto-mechanical M×N switch for optical fiber forming a presently preferred embodiment of the invention has been described above. The switch is based on a Risley prism pair for steering the light from the core of any optical fiber in a 2D input array to the core of any optical fiber in a 2D output array. The switch is more than one hundred times less sensitive to motion of the steering mechanism than an equivalent tilting mirror would be. Therefore, it provides very high resolution and very stable steering of the light beam in addressing individual elements of the optical fiber array. It will be appreciated however, by those skilled in the art that many alterations and modification, some of which are suggested above, will become apparent following a reading of this disclosure. For example, although the preferred embodiment describes the use of stepper motors to rotate the prisms, those skilled in the art will appreciate that there are many other ways to provide the requisite precise rotary motion, including dc and ac motors used in conjunction with rotary encoders, and servo motors. It is therefore to be understood that the appended claims are intended to cover all such alterations and modifications as fall within the true spirit and scope of the invention.

What is claimed is:

1. An optical fiber switch for coupling light from an input fiber to an output fiber, comprising:
   a collimating lens for collimating light from the input fiber;
   an objective lens;
   Risley prism means disposed between said collimating lens and said objective lens and including first and second prisms disposed proximate each other for receiving and directing said collimated light, said first and second prisms being rotatable to selectively redirect said collimated light; and
   drive means for selectively rotating at least one of said first and second prisms over a range of 360 degrees relative to the other and into a particular relationship therewith such that said collimated light is directed into said objective lens and focused thereby either onto of off of an output fiber.

2. An optical fiber switch as recited in claim 1 wherein said objective lens is adapted to focus said collimated light onto one of a plurality of output fibers.

3. An optical fiber switch as recited in claim 1 wherein said input fiber and said output fiber are both single mode optical fibers.

4. An optical fiber switch as recited in claim 1 wherein said collimating lens and said objective lens define an optical axis, and said first and said second prisms rotate about said optical axis.

5. An optical fiber switch as recited in claim 1 wherein said input fiber is one of a plurality of input fibers.

6. An optical fiber switch as recited in claim 1 wherein said output fiber is one of a plurality of output fibers.

7. An optical fiber switch as recited in claim 1 wherein said input fiber is one of a plurality of input fibers and said output fiber is one of a plurality of output fibers.

8. An optical fiber switch as recited in claim 1 wherein at least one of said first and second prisms is an achromatic prism.

9. An optical fiber switch as recited in claim 1 wherein said drive means includes first and second electrical motors respectively connected to said first and second prisms for rotating said prisms about a common axis.

10. An optical fiber switch as recited in claim 9 wherein said drive means further includes a microprocessor for generating control signals for causing said motors to rotate said prisms into selected rotational positions.

11. An optical fiber switch as recited in claim 9 wherein said first and second motors are stepper motors and each rotational step thereof causes the associated prism to rotate a predetermined angle about said common axis.

12. An optical fiber switch as recited in claim 9 wherein said first and second motors respectively include first and second rotors, each said rotor having a passageway extending therethrough along the rotational axis thereof, and wherein one end of each said rotor is attached to one of said prisms to cause rotation thereof about said common axis.

13. An optical fiber switch as recited in claim 9 wherein said objective lens is adapted to focus said collimated light onto one of a plurality of output fibers, and said drive means includes first and second electrical motors respectively connected to said first and second prisms for rotating said prisms about a common axis.

14. An optical fiber switch as recited in claim 12 wherein said collimating lens is disposed within one of said passageways, and said objective lens is disposed within the other passageway.

15. An optical fiber switch as recited in claim 14 wherein an input ferrule positions the output face of said input fiber at the focal point of said collimating lens.

16. An optical fiber switch as recited in claim 14 wherein an output ferrule positions the input face of said output fiber at the focal plane of said objective lens.

17. An optical fiber switch as recited in claim 9 wherein means are provided for mounting said first and second motors such that the rotational axes thereof are coaxial with said common axis.

18. An optical fiber switch as recited in claim 1 wherein an input ferrule positions the output faces of a plurality of input fibers in the focal plane of said collimating lens such that light emitted from any one of said input fibers can be coupled into said output fiber by rotating said prisms into predetermined corresponding angular relationships.

19. An optical fiber switch as recited in claim 16 wherein said output fiber is one of a plurality of output fibers organized in a regular array and said output ferrule holds the input faces of said output fibers in the focal plane of said objective lens.

20. An optical fiber switch as recited in claim 1 and further comprising a wavelength selective dispersion element disposed within the path of said collimated light so that a particular wavelength may be selectively focused on said output fiber.

21. An optical fiber switch as recited in claim 20 wherein said wavelength selective dispersion element includes another prism.

22. An optical fiber switch as recited in claim 20 wherein said wavelength selective dispersion element includes a diffraction grating.

23. An optical fiber switch as recited in claim 10 and further comprising a temperature sensor for monitoring the temperature of said switch and reporting same to said microprocessor so that said control signals can be adjusted for temperature variation.

24. An optical switch for communicatively coupling an approximately collimated light beam between an input source and an output receiver, comprising:

a collimating lens for collimating an input light beam;

an objective lens disposed along a common optical axis shared with said collimating lens and separated therefrom by two focal lengths;

prism means including a pair of thin prisms positioned proximate each other and disposed midway between said collimating lens and said objective lens for receiving and directing a collimated light beam passing therethrough, said thin prisms being independently rotatable about said common axis; and drive means for selectively rotating at least one of said thin prisms over a range of 360 degrees relative to the other and about said common axis such that said light beam is selectively directed onto or off of said output receiver, said drive means including first and second electrical hollow shaft motors having rotors respectively connected to said prisms for independently rotating said prisms about said common axis.

25. An optical switch as recited in claim 24 and further comprising:

a microprocessor for generating control signals for causing said motors to rotate said prisms into selected predetermined rotational relationships whereby said light beam is selectively directed onto or off of said output receiver.

26. An optical switch as recited in claim 24 wherein said motors are stepper motors and each rotational step thereof causes the associated prism to rotate a predetermined angle about said common axis.

27. An optical switch as recited in claim 24 wherein at least one of said pair of prisms is an achromatic prism.

28. An optical switch as recited in claim 24 wherein said output receiver is one of an array of output receivers, and wherein said objective lens is adapted to focus said light beam, and wherein said drive means is operative to selectively rotate said prisms about said common axis such that the focussed light beam may be directed onto a selected receiver of said array of output receivers.

29. An optical switch as recited in claim 28 wherein said drive means further includes a microprocessor for generating control signals for causing said motors to rotate said prisms into selected rotational positions.

30. An optical switch as recited in claim 29 wherein said first and second motors are stepper motors and each rotational step thereof causes the associated prism to rotate a predetermined angle about said common axis.

31. An optical switch as recited in claim 30 wherein each said rotor has a passageway extending therethrough and along the rotational axis thereof, and wherein one end of each said rotor is attached to one of said thin prisms to cause rotation thereof about said common axis.

32. An optical switch as recited in claim 31 wherein said collimating lens is disposed within one of said passageways, and said objective lens is disposed within the other of said passageways.

33. An optical switch as recited in claim 32 wherein an input ferrule positions said input source in the focal plane of said collimating lens.

34. An optical switch as recited in claim 32 wherein an output ferrule positions the output receiver in the focal plane of said objective lens.

35. An optical switch as recited in claim 33 wherein said input ferrule positions a plurality of light sources in the focal plane of said collimating lens such that light emitted from any one of said sources can be selectively coupled to any one of an array of output receivers by rotating said prisms into predetermined corresponding angular relationships.

36. An optical switch as recited in claim 35 wherein the light receiving faces of said output array are organized in a regular array, and an output ferrule holds said faces in the focal plane of said objective lens.

37. An optical switch as recited in claim 24 further comprising a wavelength selective dispersion element disposed within the path of said collimated light beam so that a particular wavelength thereof may be selectively focused onto the output receiver.

38. An optical fiber switch as recited in claim 37 wherein said wavelength selective dispersion element includes another prism.

39. An optical switch as recited in claim 37 wherein said wavelength selective dispersion element includes a diffraction grating.

40. An optical switch as recited in claim 25 and further comprising a temperature sensor for monitoring the temperature of said switch and reporting same to said microprocessor so that said control signals can be adjusted for temperature variation.

* * * * *